US008482527B1

United States Patent
Kim

(10) Patent No.: US 8,482,527 B1
(45) Date of Patent: Jul. 9, 2013

(54) APPARATUS AND METHOD OF PROVIDING USER INTERFACE ON HEAD MOUNTED DISPLAY AND HEAD MOUNTED DISPLAY THEREOF

(71) Applicant: LG Electronics Inc., Seoul (KR)

(72) Inventor: Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/708,561

(22) Filed: Dec. 7, 2012

(30) Foreign Application Priority Data

Sep. 14, 2012 (KR) ........................ 10-2012-0102277

(51) Int. Cl.
*G09G 5/00* (2006.01)
(52) U.S. Cl.
USPC ................................ 345/168; 345/8; 715/773
(58) Field of Classification Search
USPC .................. 345/7–9, 156–184; 715/773, 863, 715/700–702
See application file for complete search history.

(56) References Cited

U.S. PATENT DOCUMENTS

| 6,771,294 | B1 | 8/2004 | Pulli et al. |
| 2010/0079356 | A1* | 4/2010 | Hoellwarth ........................ 345/8 |
| 2011/0214082 | A1* | 9/2011 | Osterhout et al. ............ 715/773 |
| 2011/0221793 | A1 | 9/2011 | King, III et al. |

* cited by examiner

*Primary Examiner* — Jimmy H Nguyen
(74) *Attorney, Agent, or Firm* — Birch, Stewart, Kolasch & Birch, LLP

(57) ABSTRACT

An apparatus and method of providing a user interface (UI) on head mounted display and the head mounted display (HMD) thereof are discussed. The apparatus comprises a sensor unit detecting whether an object exists in the proximity of the HMD and if the object is detected, the sensor unit senses a distance between the object and the HMD. The apparatus further comprises a processor controlling a User Interface (UI) of the HMD based on a result of the sensor unit. A physical User Interface (UI) mode is applied if the detected object is within a predetermined distance from the HMD and a non-physical User Interface (UI) mode is applied if the object is not detected or is not within the predetermined distance from the HMD.

20 Claims, 16 Drawing Sheets

F1 status

F2 status

F3 status

APPARATUS AND METHOD OF PROVIDING USER INTERFACE ON HEAD MOUNTED DISPLAY AND HEAD MOUNTED DISPLAY THEREOF

This application claims the benefit of Korean Patent Application No. 10-2012-0102277, filed on, Sep. 14, 2012, which is hereby incorporated by reference as if fully set forth herein.

BACKGROUND OF THE INVENTION

Field of the Invention

The exemplary embodiments of present invention relate to an apparatus and method of providing a User Interface (UI) and/or a User Experience (UX) (herein after, "UI"), and more particularly to an apparatus and method of determining an optimized UI and providing the UI on a head mounted display and a head mounted display thereof.

The UI technology is an interface method that helps users conveniently utilize diverse digital devices. In more details, the UI technology is a part of a program that a user counter-interacts with in order for the user and a digital device to offer and obtain information. For example, it is called a command-line interface in which the user inputs a command to run a program, a menu-driven interface operated by commands of menu selection, and a Graphic User Interface (GUI) in which a figure display program is operated by using position locating devices such as an optical pen, mouse, control ball, and a joystick. Further, recently, a gesture UI operated by a user's action commands and a voice recognition UI operated by the user's voice without his or her action have been developed to be applied to the digital devices.

In addition, as the trend goes toward minimizing the weight and size of the digital devices, diverse wearable digital devices have been developed. As one of the wearable digital devices, a head mounted display (HMD) that can be worn on the face, as if eye glasses are, has been developed. The HMD can be collaborated with technologies such as Augmented Reality technology and N Screen technology beyond the simple display use, providing users many diverse conveniences.

Accordingly, the aforementioned diverse UI technologies can be applied to the HMD. However, it is difficult to determine an optimized UI for the HMD because the HMD can be worn on a user and freely moved. Therefore, a technology providing a very efficient and convenient UI is demanded considering the characteristics of the HMD and ambient environmental conditions in the proximity of the HMD.

SUMMARY OF THE INVENTION

Accordingly, the exemplary embodiments of present invention are directed to an apparatus and method of providing a User Interface that substantially obviates one or more problems due to limitations and disadvantages of the related art.

One object of the exemplary embodiments is, in providing a Head Mounted Display User Interface (HMD UI), to provide an optimized HMD UI considering the ambient environmental conditions in the proximity of the HMD. Especially, another object of the exemplary embodiments is to apply the HMD UI differently based on whether a usable object for the HMD UI exists in the proximity of the HMD.

Another object of the exemplary embodiments is to change and provide an optimized HMD UI based on the ambient environmental conditions in the proximity of the HMD that is being used at present.

Additional advantages, objects, and features of the exemplary embodiments will be set forth in part in the description which follows and in part will become apparent to those having ordinary skill in the art upon examination of the following or may be learned from practice of the exemplary embodiments. The objectives and other advantages of the exemplary embodiments may be realized and attained by the structure particularly pointed out in the written description and claims hereof as well as the appended drawings.

To achieve these objects and other advantages and in accordance with the purpose of the exemplary embodiments, as embodied and broadly described herein, a method of providing a User Interface (UI) includes the steps of detecting whether an object exists in the proximity of the HMD and determining a distance between the detected object and the HMD if the object is detected. The method further includes the step of applying a UI mode if the detected object is within a predetermined distance from the HMD. Finally, the method includes the step of applying a non-physical UI mode if the object is not detected or is not within the predetermined distance from the HMD.

In another aspect of the exemplary embodiments, a UI apparatus comprises a sensor unit detecting whether an object exists in the proximity of the HMD and if the object is detected, the sensor unit senses a distance between the object and the HMD. The apparatus further comprises a processor controlling a User Interface (UI) of the HMD based on a result of the sensor unit. The physical UI mode is applied if the detected object is within a predetermined distance from the HMD and the non-physical UI mode is applied if the object is not detected or is not within the predetermined distance from the HMD.

It is to be understood that both the foregoing general description and the following detailed description of the embodiments are exemplary and explanatory and are intended to provide further explanation of the exemplary embodiments as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the exemplary embodiments. In the drawings.

DETAILED DESCRIPTION OF THE INVENTION

Reference will now be made in detail to the exemplary embodiments of present invention, examples of which are illustrated in the accompanying drawings. Wherever possible, the same reference numbers will be used throughout the drawings to refer to the same or like parts.

Figure 1A:
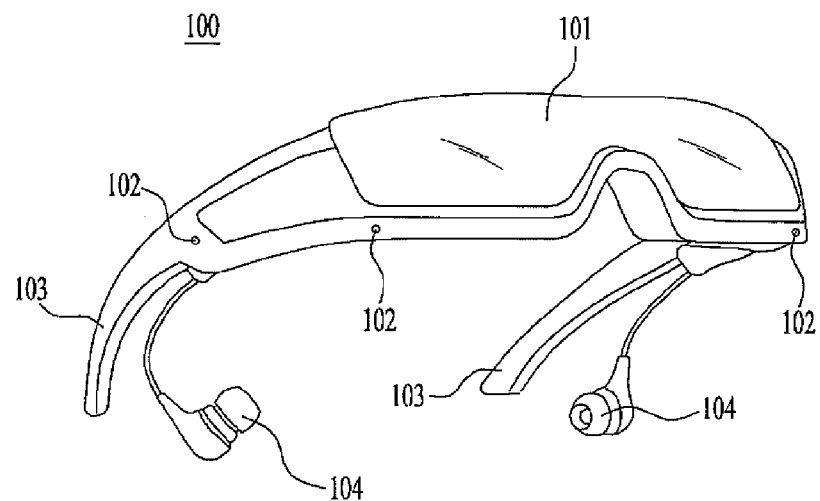
FIGS. 1a and 1b show drawings to explain a HMD according to the exemplary embodiments of present invention.
Figure 1B:
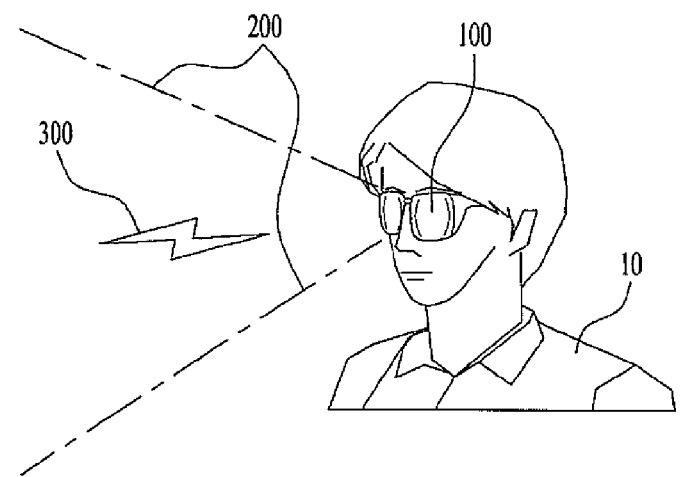

FIGS. 1a and 1b show drawings to explain a HMD as an example according to the exemplary embodiments of present invention. In more details, FIG. 1a indicates an example of the external configuration of a HMD 100 and FIG. 1b indicates an example of the HMD 100 worn on a user 10. Accordingly, the present invention is not limited to the external configuration of the HMD 100 and clearly any external configurations of a HMD can be utilized to realize the exemplary embodiments.

Especially, the HMD 100 to which an UI is applied includes a display screen 101 and at least one sensor 102. Not only all contents and images are provided the user 10 by the HMD through the display screen 101 but also information about the UI of the exemplary embodiments is provided. Further, the HMD 100 includes at least one sensor 102, detects ambient environmental conditions in the proximity of the HMD 100, and is utilized as an important element to determine a HMD UI to operate such sensor functions. Further, the HMD 100 is able to include a supporting component 103 in order for the user 10 to wear the HMD 100 in the head and an audio outputting unit 104 wearable in the ear.

FIG. 1b shows a drawing of the HMD 100 worn on the user 10 in order to explain the status of the HMD 100 that is being used at present. According to an embodiment to be mentioned, the HMD 100 includes a predetermined distance of a view angle area 200. The view angle area 200 is a predetermined area that corresponds to the user 10 wearing the HMD 100 and can include an area with a certain angle in the forward direction of the HMD 100. Further, according to the embodiment, the HMD 100 and an external digital device (not shown in the drawing) can be connected to communicate by a network 300. For example, usable wireless networks are Near Field Communication (NFC), Zigbee, Infrared Communications, Bluetooth, and WIFI. That is, in the exemplary embodiments, communications between the HMD 100 and the digital device can be realized by one of the enumerated networks 300 above or a combination of them. Yet, the exemplary embodiments is not limited to those mentioned above.

Figure 2:
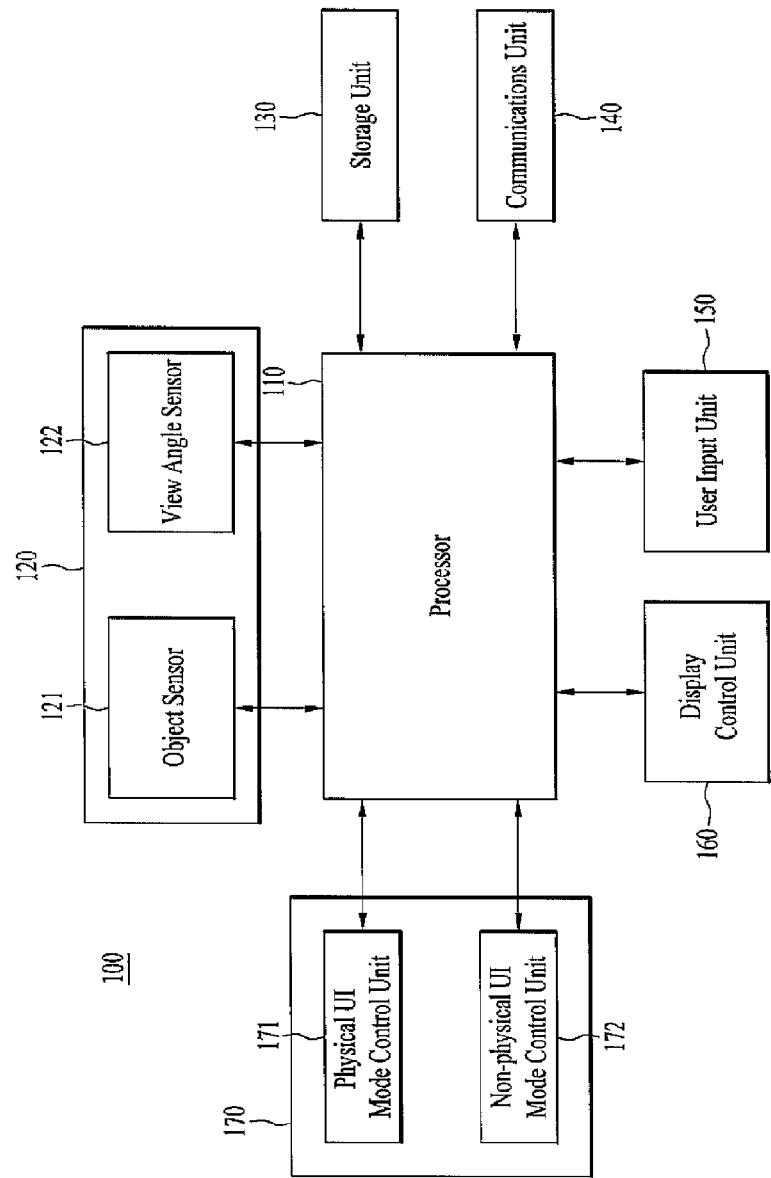
FIG. 2 shows a block diagram for a HMD internal configuration according to the exemplary embodiments of present invention.

FIG. 2 shows a block diagram for a HMD internal configuration.

According to FIG. 2, the HMD 100 of the exemplary embodiment includes a processor 110, a sensor unit 120, a storage unit 130, a communications unit 140, a user input unit 150, a display controller 160, a UI control unit 170.

The sensor unit 120 can be internally or externally equipped in the HMD 100 and informs the processor 110 of ambient environmental conditions that the HMD 100 recognizes. Then, the sensor unit 120 can include a plurality of sensing methods. For example, the sensor unit 120 not only detects objects or things in the proximity of the HMD 100, called "objects" but also ensures the type of the detected object and can include an object sensor 121 sensing the distance between the detected object and the HMD. Further, the sensor unit 120 can include a view angle sensor 122 sensing the view angle of the HMD 100. More detailed functions and operations of the object sensor 121 and the view angle sensor 122 will be illustrated below. Accordingly, the sensor unit, for example, can be internally or externally equipped in the HMD like a 102 in FIG. 1a.

Also, a plurality of the sensing methods the sensor unit 120 can be configured with includes, for example, a gravity sensor, magnetic sensor, motion sensor, gyro sensor, acceleration sensor, infrared sensor, inclination sensor, brightness sensor, elevation sensor, olfactory sensor, temperature sensor, depth sensor, pressure sensor, bending sensor, audio sensor, video sensor, Global Positioning System (GPS) sensor, and touch sensor. Yet, the exemplary embodiments are not limited to the enumerated. That is, it is sufficient that the sensor unit 120 senses a HMD user and ambient environmental conditions in the proximity of him or her and sends the result of the sensing in order for the processor 110 to be operated accordingly, and the detailed sensing method of the sensor unit 120 is not limited to the enumerated sensing methods.

Further, the storage unit 130 can store diverse digital data such as video, audio, pictures, movie clips, and applications. The storage unit 130 indicates diverse digital data storage space such as flash memory, Random Access Memory (RAM), and Solid State Drive (SSD).

Further, the communications unit 140 transmits and receives data by performing communications with external digital devices and diverse protocols. The HMD 100 of the exemplary embodiment performs pairing with and connecting communications with digital devices in the proximity of the HMD 100 by using the communications unit 140. On the other hand, the communications unit 140 can include a plurality of antennas. The HMD 100 detects the location of a digital device that is being communicated with the HMD by using a plurality of the antennas. That is, the HMD 100 detects the location of the digital device that is being communicated with the HMD by using the time and altitude differences between the transmitted or received signals through a plurality of the antennas.

Further, the user input unit is a device that receives user control commands controlling the use of the HMD 100. The user control commands can include user configuration commands. For example, according to an embodiment of the exemplary embodiments, the user 10 may set the operation corresponding to ambient environmental conditions in the proximity of the HMD UI and predetermine a certain UI mode without the ambient environmental conditions by using the user control information from the user input unit 150. Thus, based on the predetermined setting by the user, when the HMD UI is set to operate in correspondence to ambient environmental conditions, the UI mode can automatically change according to the embodiment of the exemplary embodiments. Meanwhile, based on the predetermined settings by the user, when the certain UI mode is fixed regardless of the ambient environmental conditions, the fixed UI mode will operate on "On" status if the fixed UI mode is in the operable status and if not the UI mode will operate on "Off" status.

Also, the display control unit 160 outputs motion pictures or images on the HMD display screen 101. Further, according to an embodiment, the display control unit 160 provides an HMD external object with an imagery UI screen or performs controlling functions for providing an external digital device with a UI screen. In addition, according to an embodiment, the display control unit 160 provides information to determine the UI for the HMD display screen 101 or images according to the determined UI. Detailed description will be further illustrated.

Also, the UI control unit 170 provides a HMD user with an UI and controls the provided UI. The UI control unit 170 includes a physical UI control unit 171 and a non-physical UI control unit 172.

As the physical UI control unit 171 indicates an UI that can have a physical contact with a user, it can be, for example, a virtual keyboard UI and drawing UI as an embodiment. The virtual keyboard UI indicates a UI method that displays a virtual keyboard on the surface of the detected object in the proximity of the HMD, receives a command by the user's keyboard touch, and operates accordingly. In addition, the drawing UI indicates a UI method that provides with an imaginary drawing panel on the surface of the detected object in the proximity of the HMD and inputs a command on the drawing panel by the user using drawing tools such as an electric pen or a finger. Further, as the non-physical UI control unit 172 indicates an UI that does not have a physical contact with the user, it can be, for example, a gesture UI and voice recognition UI as an embodiment. Thus, detailed description of the UI methods will be further illustrated.

Accordingly, the physical and non-physical UIs, illustrated in the exemplary embodiments, are certain UI methods and are not limited to only the aforementioned virtual keyboard, drawing, gesture, and voice recognition UIs. That is, the physical UI indicates all UIs that can have a physical contact with an object and the non-physical UI indicates all UIs that do not need a physical contact with an object.

As the processor 110 is a main HMD controller, it controls not only each block of the HMD 100 but also information and data transmission and reception between each block. In the following, detailed process of the exemplary embodiments can be operated mainly by the control operations of the processor 110. Accordingly, the internal configuration block diagram of the HMD 100 shown in FIG. 2 is illustrated as an embodiment for explanation purposes only. Thus, each block shown in FIG. 2 may be combined as a whole or some necessary blocks may be separated and combined as a whole. For example, the processor 110 may be composed with the UI control unit as a combined controller.

Figure 3:
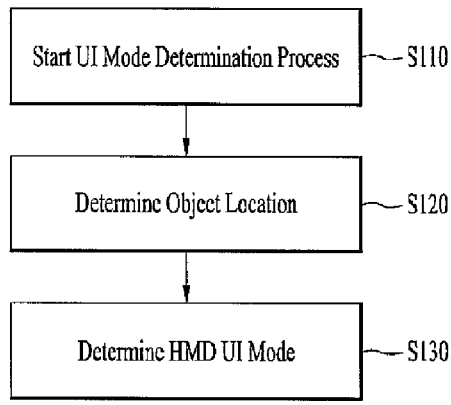
FIGS. 3 and 4 show flowcharts of UI mode determination process according to object location as a first exemplary embodiment of present invention.
Figure 4:
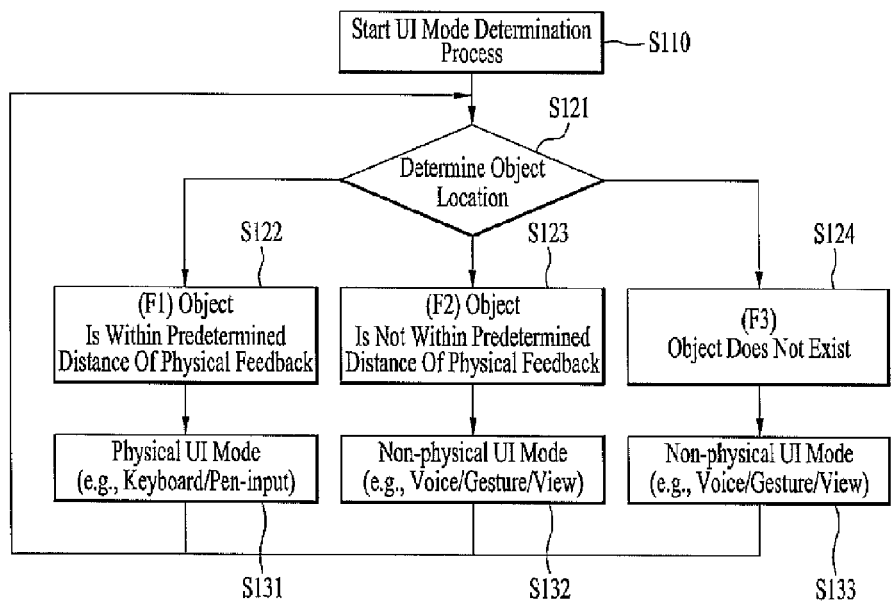

FIGS. 3 and 4 as the embodiments of the exemplary embodiments show flowcharts of the HMD UI mode determination process according to the object location. Further, FIGS. 5a, 5b, 5c, 6a, 6b, 7a, and 7b are drawings to explain the exemplary embodiments of the present invention.

In the exemplary embodiments, an object is a physical thing or entity that exists in the proximity of the user worn on the HMD and it includes, for example, a wall, table, and ball. The first embodiment of the exemplary embodiments applies a UI mode based on the detection of an object in the proximity of the HMD 100. Further description is as follows.

The UI mode determination process to apply the HMD is operated by a user's request or automatic system settings. S110. For example, S110 can be operated based on settings determined by the user. In more details, for example, the user 10 can predetermine settings according to ambient environmental conditions in the proximity of the HMD UI and in that case, the processor 110 can control the HMD so that the HMD UI automatically changes according to the ambient environmental conditions. In the following, the exemplary embodiments of present invention will describe an optimized HMD UI determination process in the case that the HMD UI is preset to be operated according to the ambient environmental conditions.

According to the first embodiment of the exemplary embodiments, the HMD UI mode process comprises the steps of object location determination S120 and HMD UI mode determination S130. When the HMD UI mode process begins, the HMD processor 110 detects an object in the proximity of the HMD and determines the location of the object through the object sensor S121. Based on the result of the S121 determination, the processor 110 separates the relationship between the HMD and the object into three statuses.

Figure 5A:
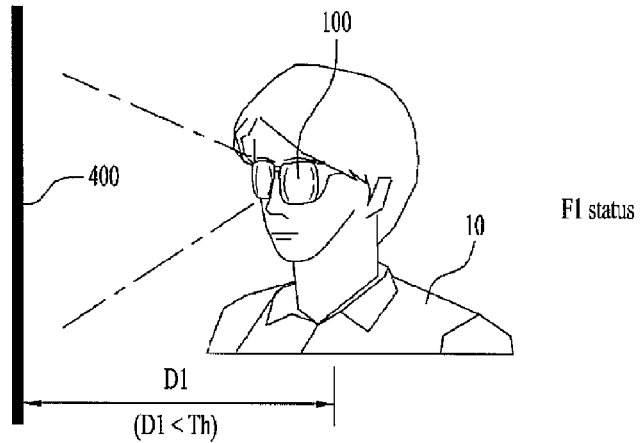
FIGS. 5a, 5b, and 5c are drawings to show how the UI mode determination process is applied to the first exemplary embodiment of present invention.

For example, it is called F1 status when an object is detected and the detected object stays within distance in which physical feedback is possible, shown in S122, FIG. 5a. In addition, it is called F2 status when an object is detected and the detected object stays not within distance in which physical feedback is possible, shown in S123, FIG. 5b. Lastly, it is called F3 status when an object does not exist in the proximity of the HMD, shown in S124, FIG. 5c.

Figure 5B:
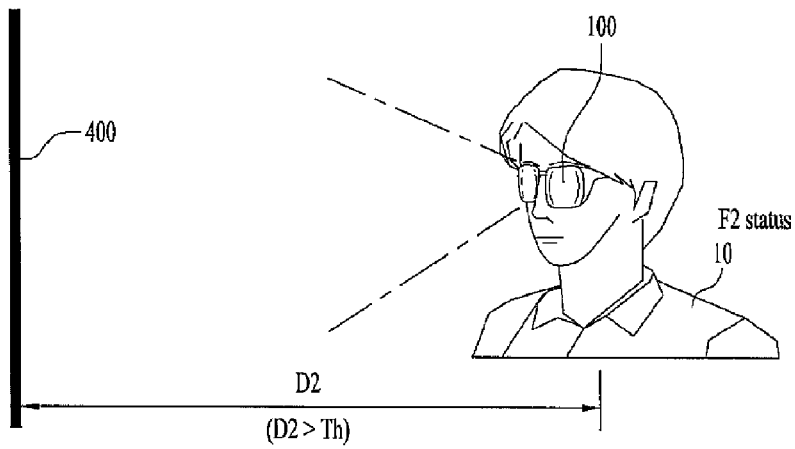
Figure 5C:
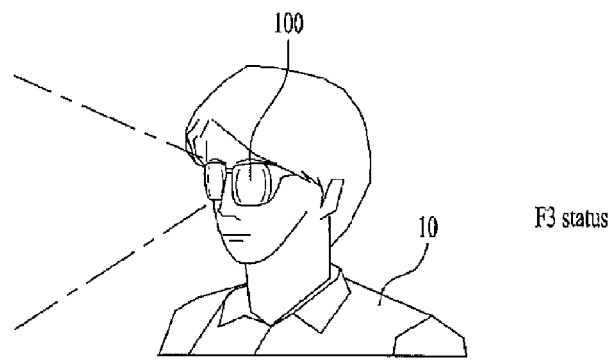

The further illustration of the F1, F2, and F3 statuses in FIGS. 5a, 5b, and 5c are as follows. The HMD 100 processor 110 determines whether an object 400 exists and where it is located through the object sensor 121. For example, FIGS. 5a and 5b demonstrate when the object 400 is detected in the proximity of the HMD and FIG. 5c demonstrates when an object does not exist. Further, FIG. 5a shows when a distance, called D1, between the detected object 400 and the HMD is less than a predetermined distance, called Th. S122. On the other hand, FIG. 5b shows when a distance, called D2, between the detected object 400 and the HMD is larger than the predetermined distance, called Th. Accordingly, the predetermined distance Th can be set as a distance in which the user can have a physical contact with and touch the object 400. Therefore, the F1 status of FIG. 5a indicates a status in which the user can touch the object and the F2 status of FIG. 5b indicates a status in which the user cannot touch the object 400 even if it exists. Further, the F3 status of FIG. 5c is a status in which the object 400 does not exist in the proximity of the HMD.

When a status of the object in the proximity of the HMD is determined as F1 (S122), F2 (S123), or F3 (S124) through the step of S121, the HMD processor 110 selects a HMD UI and operates it by the UI control unit 170. For example, in the case of F1 (S122), the aforementioned physical UI mode is applied S131 and in the case of F2 status (S123) or F3 status (S124), the aforementioned non-physical UI mode is applied S132. These physical and non-physical UI modes can also be referred as Object and Non-object modes, respectively.

In addition, although a certain HMD UI is being currently applied through S131, S132, or S133, the processor 110 continuously detects an object and determines the location of the object S121 and when the state changes, for example, from F1 to F3, or from F2 to F1, the HMD UI mode can be automatically changed. Accordingly, in an embodiment, it is possible that the user 10 may be informed of the change when the UI mode automatically changes.

Figure 6A:
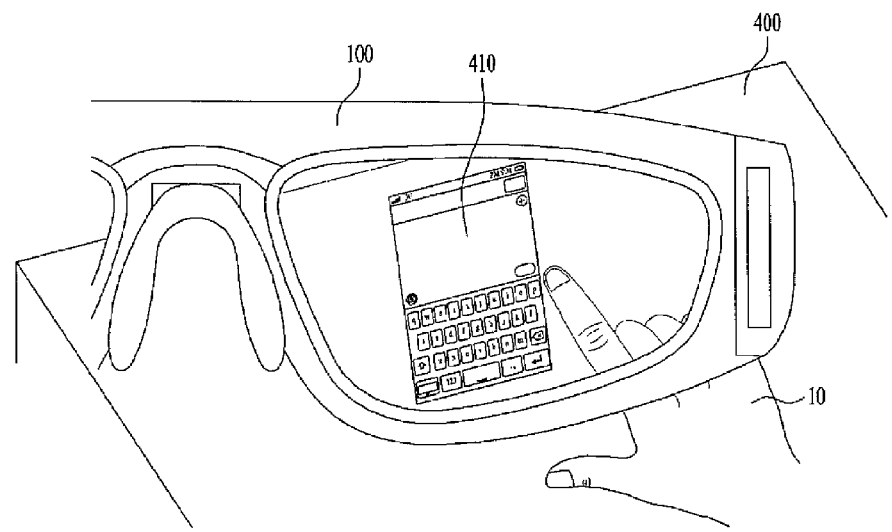
FIGS. 6a and 6b show an example of physical UI mode (e.g., keyboard, drawing) according to the exemplary embodiments of present invention.
Figure 6B:
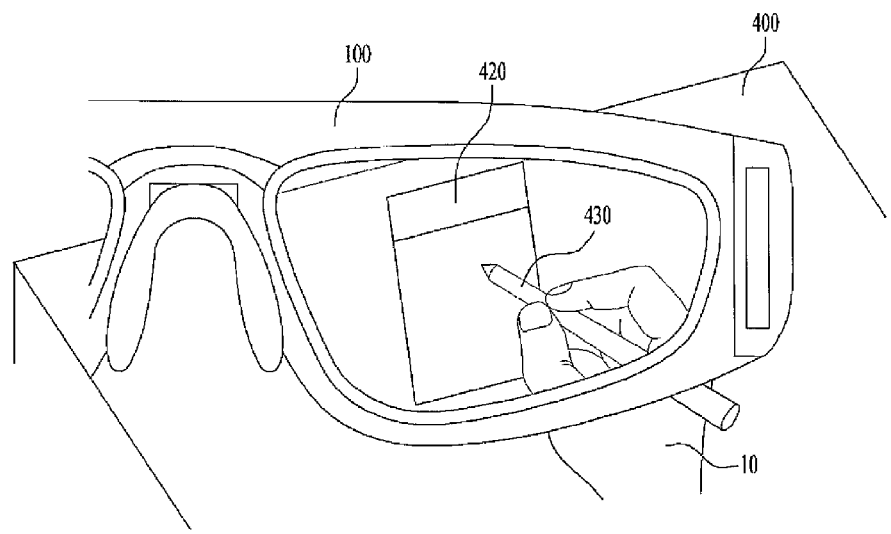

Accordingly, as the UI mode that F1 status is applied to indicates that the user 10 can directly contact or touch the UI, it can be, for example, a virtual keyboard UI method shown in FIG. 6a or a drawing UI method shown in FIG. 6b. Yet, these are only the embodiments of the exemplary embodiments and other diverse UI methods that can be physically touched can clearly exist.

For example, the virtual keyboard UI method of FIG. 6a displays the virtual keyboard 410 on the surface of the detected object 400 and generates a command that the user directly inputs by touching the virtual keyboard 410. Then, the corresponding object 400 provides the user 10 with the touch feeling so that the user 10 can efficiently use the virtual keyboard 410. Also, the drawing UI method of FIG. 6b is a method, for example, in which a virtual window 420 that can be drawn is displayed on the surface of the detected object 400 and the user 10 generates desired commands by using a pen 430. Then, the corresponding object 400 provides the user 10 with the touch feeling so that the user 10 can efficiently use the pen 430.

Accordingly, when the physical UI mode is selected as the HMD UI in S131, one of a plurality of the physical mode UIs can be selected by the user's settings or the system's settings. For example, as the user 10 can predetermine the settings by using the user input unit 150, it is possible that in the case of the physical UI mode determination, either one of the virtual keyboard shown in FIG. 6a or the drawing UI method shown in FIG. 6b can be prematurely set as a default. Or, when the user's settings do not exist, the UI control unit 170 can determine whether drawing input devices such as the pen 430 exist. If a drawing input device exists, the drawing UI method shown in FIG. 6b can be prematurely selected and if a drawing device does not exist, the virtual keyboard shown in FIG. 6a can be prematurely selected. Also, although a UI method has been prematurely selected, a different UI method can be used if there is any change. For example, when the user 10 is using the virtual keyboard UI method shown in FIG. 6a, the drawing UI method shown in FIG. 6b can be automatically used in the case of grabbing a drawing input device by hand. Also, with regard to the original determined UI mode, the user can change the UI mode at any time when the user desires to change to a certain UI mode.

Further, when the virtual keyboard UI method is applied as shown in FIG. 6a as a physical UI, the location of the virtual keyboard 410 on the surface of the object can be controlled in various ways. Further illustration is as follows.

For example, the virtual keyboard 410 can be created at a point where the user hand 10 is located. That is, the processor 110 determines whether the user hand 10 is approaching near or touching the surface of the object 400 and controls to generate the virtual keyboard 410 at a point where the corresponding user hand 10 is located. Accordingly, as an object that the user wants is created and the virtual keyboard is created at a certain point of the surface of the object, the user can conveniently utilize the virtual keyboard.

Also, it is possible that different types and sizes of the virtual keyboard can be created depending on whether the user is using only one hand or both hands. For example, the UI control unit 170 is equipped with a one-hand virtual keyboard like a small size keyboard or a two-hand virtual keyboard like a large size keyboard, and the processor 110 controls to generate either one of the one-hand or two-hand keyboards by determining the number of fingers that are approaching near or touching the object.

In addition, the location of the virtual keyboard 410 can be determined based on the user's view angle. For example, the processor 110 can control to determine whether the user is using a first view angle, the view angle of the right eye, or a second view angle, the view angle of the left eye, or both. The processor 110 then controls the virtual keyboard 410 so that the virtual keyboard 410 is located at an appropriate point corresponding to the view angle. For example, the appropriate point corresponding to the view angle can be the center point of the corresponding view angle when only one view angle is used or the overlapping point of the corresponding view angles when the both view angles are used.

Further, all the aforementioned embodiments can be combined and used. That is, for example, the processor 110 can determine the type of the virtual keyboard by determining whether the user 10 is using only one hand or two hands and generate the determined virtual keyboard on the surface of the object that the user hand or hands 10 is/are approaching near or touching. Also, the processor 110 can first determine the type of the virtual keyboard by determining whether the user 10 is using one hand or two hands, and generate the determined virtual keyboard at an appropriate point of the view angle that the user is using. Also, the processor 110 can first determine the type of the virtual keyboard by determining whether the user 10 is using one hand or two hands, generate the determined virtual keyboard at an appropriate point of the view angle that the user is using, and move the generated virtual keyboard on the surface of the object that the user hand 10 is approaching near or touching.

Further, the processor 110 can first determine the type of the virtual keyboard by determining whether the user 10 is using one hand or two hands and generate the determined virtual keyboard at the most appropriate location by comparing the appropriate point of the view angle with the location of the surface of the object that the user 10 is approaching or touching. For example, in the case of the user hand 10 not within the view angle, the virtual keyboard can be created at the boundary of the view angle. It is because it is determined that the user hand 10 has nothing to do with the virtual keyboard. On the other hand, in the case of the user hand 10 within the view angle, the virtual keyboard can be created at the location of the user hand 10 first. It is because it is determined that the user hand 10 is preparing for the use of the virtual keyboard.

Accordingly, the diverse examples about the type and location of the aforementioned virtual keyboard 410 can be applied the same way to the type of the window 420 for the drawing UI shown in FIG. 6b and the determination of the location of the window 420.

Figure 7A:
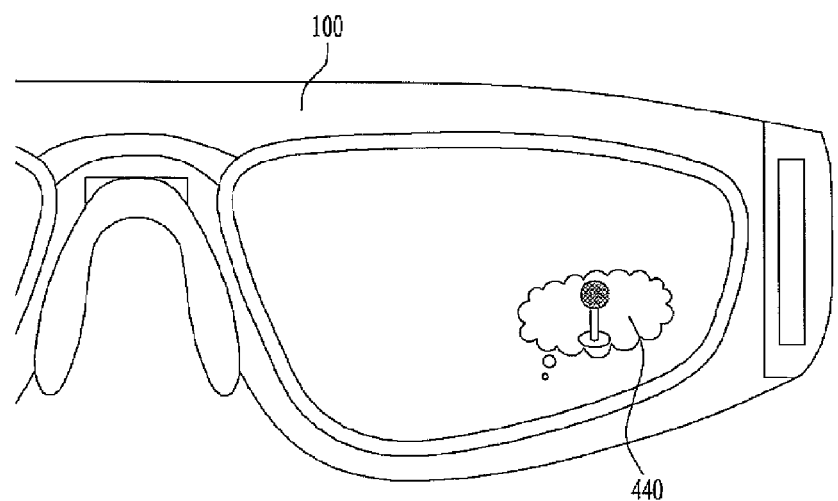
FIGS. 7a and 7b show an example of non-physical UI mode (e.g., voice, gesture) according to the exemplary embodiments of present invention.
Figure 7B:
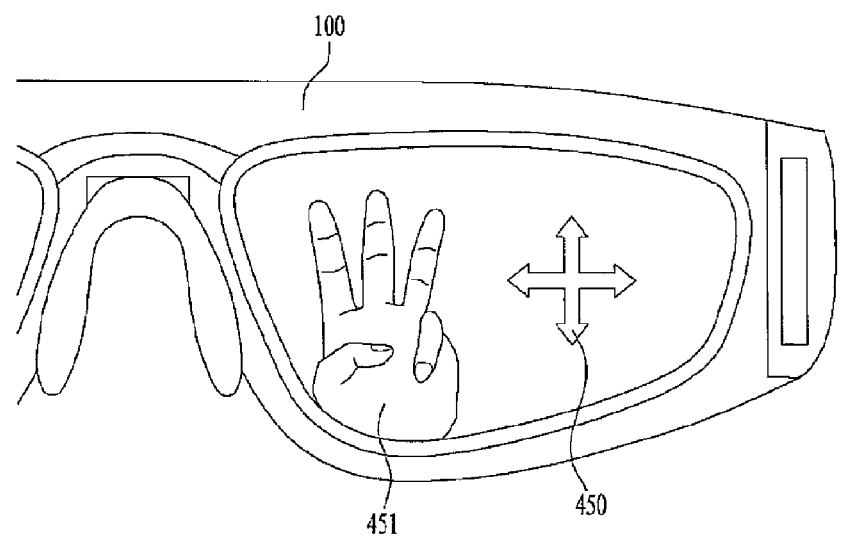

Also, as the non-physical UI mode that F2 and F3 statuses are applied to is a UI mode in which the user 10 does not physically utilize the object 400, it can be, for example, the voice recognition UI method shown in FIG. 7a, the gesture UI method shown in FIG. 7b, or a UI using eye movements. Yet, these are only the embodiments of the present invention and, as mentioned, other diverse UI methods having a non-physical contact with an object 400 clearly exist.

For example, the voice recognition UI method of FIG. 7a displays an icon 440 displaying that the voice recognition UI is being executed on the screen of the HMD display and once the user's 10 voice is inputted, the voice command is recognized, and converted through the voice recognition process in the non-physical UI mode control unit 172. Then the voice recognition UI method performs the corresponding command through the processor 110. Also, the gesture UI method of FIG. 7b displays an icon 450 displaying that the voice recognition UI is being executed on the screen of the HMD display and the gestures of the user 10 such as a user's finger move 451 and head move (not shown) are used to input commands. Once the user's gesture is inputted, gesture commands are recognized and converted through the gesture recognition process in the non-physical UI mode control unit 172, and the corresponding command is performed by the processor 110.

Accordingly, when the non-physical UI mode is determined to be applied as the HMD UI in the steps of S132 and S133, any one of a plurality of the aforementioned non-physical mode UIs can be selected by the user's settings or the system settings. For example, as the user 10 can predetermine the settings by using the user input unit 150, either one of the voice recognition UI method or the gesture UI method can be prematurely selected as a default when the non-physical UI mode is being determined. In addition, when the user's settings do not exist, the UI control unit 170 analyses noise around the user 10 and the voice recognition UI method shown in FIG. 7a is selected if the noise is below a certain level and the gesture UI method shown in FIG. 7b is prematurely selected if the noise is above a certain level. Also, although a UI method is originally determined, a different UI method can be used if there is any change. For example, when the noise around the user 10 changes from below to above a certain level, the voice recognition UI method shown in FIG. 7a may be automatically changed to the gesture UI method shown in FIG. 7b. Further, with regard to the original determined UI mode, the user can change the UI method any time the user desires. Moreover, as for the non-physical UI mode, for example, the voice recognition mode shown in FIG. 7a and the gesture UI method shown in FIG. 7b can be set to be operated at the same time and in that case the user 10 can utilize the voice recognition UI or the gesture UI or both to send the commands.

Figure 8:
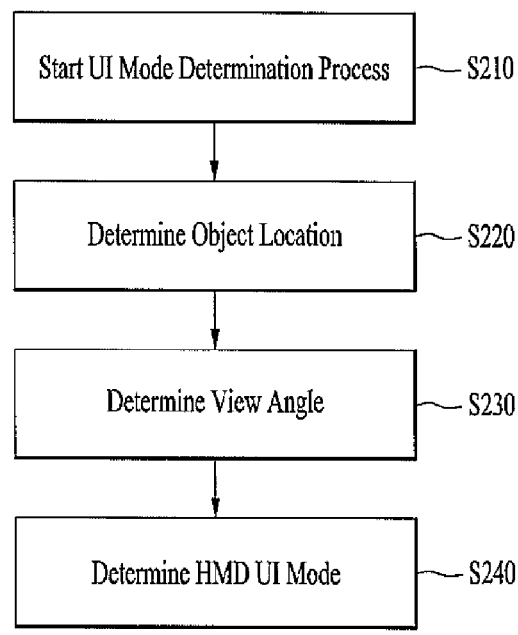
FIGS. 8 and 9 show flowcharts of UI mode determination considering a HMD view angle as a second exemplary embodiment of present invention.
Figure 9:
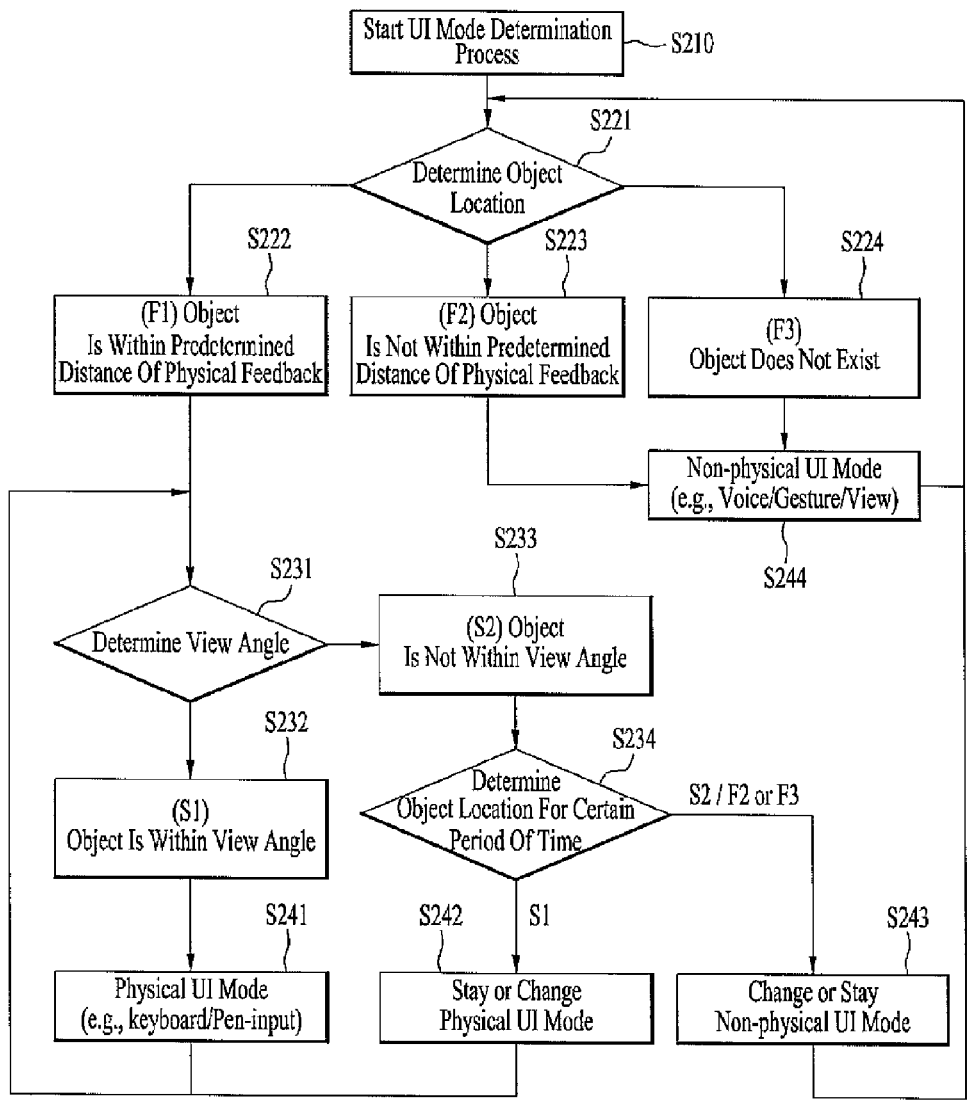
Figure 10A:
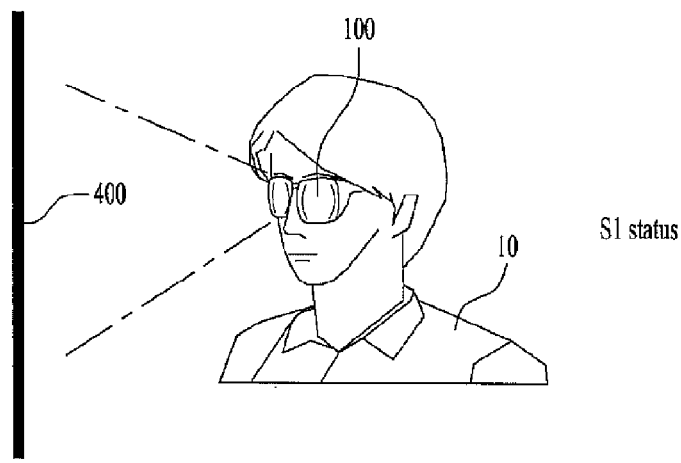
FIGS. 10a and 10b are drawings to show how the UI mode determination process is applied to the second exemplary embodiment of present invention.
Figure 10B:
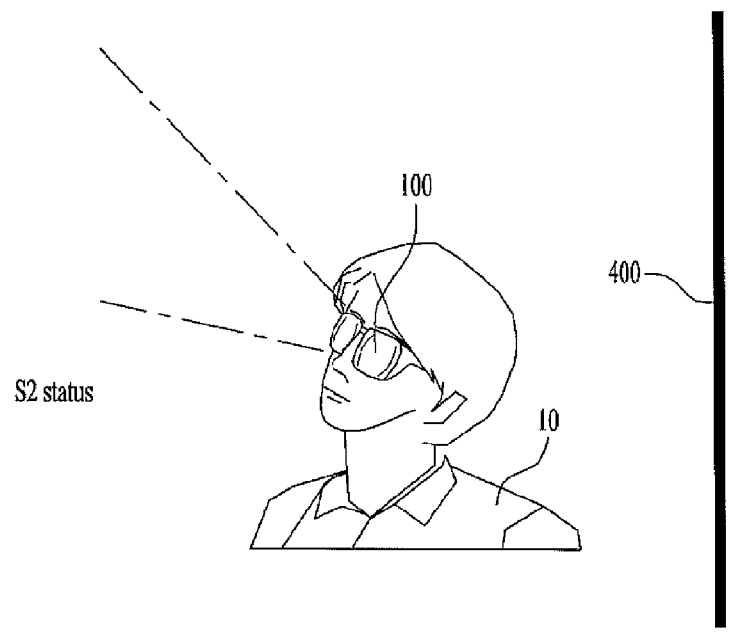

FIGS. 8 and 9 show flowcharts of the UI mode method considering the HMD view angle as a second embodiment of the exemplary embodiments. Further, FIGS. 10a and 10b are drawings to show how the UI mode determination process is applied to the second embodiment. Accordingly, the second embodiment of the exemplary embodiments considers view angle more than the first embodiment does when the UI mode is being determined. Further illustration is as follows.

According to the second embodiment of the exemplary embodiments, the HMD UI mode determination process includes the steps of object location determination S220, view angle determination S230, and HMD UI mode determination S240. Once the HMD UI mode determination process begins S210, the processor 110 detects an object in the proximity of the HMD and determines the location of the detected object S221. After the step of S221, the processor 110 determines whether the relationship between the HMD and the object is one of the aforementioned F1, F2, or F3 statuses. For example, it is called F1 status when an object is detected and the detected object stays within distance in which physical feedback is possible. S122. In addition, it is called F2 status when an object is detected and the detected object stays not within distance in which physical feedback is possible. S123. Lastly, it is called F3 status when an object does not exist in the proximity of the HMD. S124.

Then, the HMD 100 processor 110 further determines after determining F1 status S222 whether the detected object is within the HMD view angle through the view angle sensor 120. For example, according to S231, the view angle can have two statuses. Further description is as follows in reference to FIGS. 10a and 10b.

FIG. 10a shows a flowchart for the object 400 within the HMD view angle and that case is called S1 status. Further, FIG. 10b shows a flowchart for the object 400 not within the HMD view angle and that case is called S2 status. That is, S1 status indicates that the object 400 in the proximity of the HMD exists not only within the predetermined distance but also within the view angle of the user 10. On the other hand, S2 status indicates that the object 400 in the proximity of the HMD is within the predetermined distance but not within the view angle of the user.

If the HMD processor 110 confirms S1 status S232 through the step of S231, the HMD UI mode may be determined as the physical UI mode and operated as the virtual keyboard UI or drawing UI through the aforementioned physical UI mode control unit 171. S241. The physical UI type and operation method shown in the first embodiment can be applied to the second embodiment the same way.

Further, if the HMD processor 110 confirms S2 status S233 through the step of S231, the location of the object 400 is continuously confirmed for a predetermined period of time, for example five seconds (5 s) or ten seconds (10 s). S234. In the step of S234, if the object 400 is redetected within the view angle within the predetermined period of time, that is, if S2 status is changed to S1 status, the physical UI mode will be stayed. S242. Further, if the non-physical UI mode is being currently applied, it will be changed to the physical UI mode. S242. Accordingly, the fact that the status of the user 10 changes from S2 status to S1 status within the predetermined period of time indicates that the user 10 temporarily looked away from the object 400 and did not intend to look away from it for good. That is, in that case, the physical UI mode will be stayed due to the user's temporary eye movement (presume a short term intention) and if the then-existing UI mode is the non-physical UI mode, it is appropriate that the UI mode may be changed to the physical UI mode.

On the other hand, in the step of S234, if the object 400 is not detected within the view angle within the predetermined period of time (e.g., five or ten seconds), that is, if S2 status is stayed or changed to F2 or F3 status, the UI mode will change to the non-physical UI mode. S243. Or, if the physical UI mode is being currently applied, it will be changed to the non-physical UI mode. S243.

Accordingly, in the step of S234, if the user's 10 S2 status is stayed for the predetermined period of time, it is deemed that the user 10 intended to look away from the object 400 for a long term. That is, in that case, due to the user's intention of looking away for a long term, it is appropriate to stay in the non-physical UI mode or change to the non-physical UI mode if the then-existing UI mode is the physical UI mode. Further, through the step of S234, if the user's 10 status is changed to F2 or F3 status within the predetermined period of time, it is deemed that the user 10 is moving away from the object 400. That is, in that case, as the object 400 cannot utilize the physical UI, the non-physical UI mode may be stayed, and if the then-existing UI mode was the physical mode, it may be changed to the non-physical UI mode.

Further, in the case of the physical UI mode being applied as if shown in the steps of S241 and S242, the processor 110 continuously determines whether the object 400 used for the physical UI stays not within the HMD angle view. S241/S242→S231. On the other hand, in the case of the non-physical UI mode being applied as if shown in the steps of S243 and S244, the processor 110 continuously determines whether the object 400 is detected within the predetermined distance S221.

Figure 11:
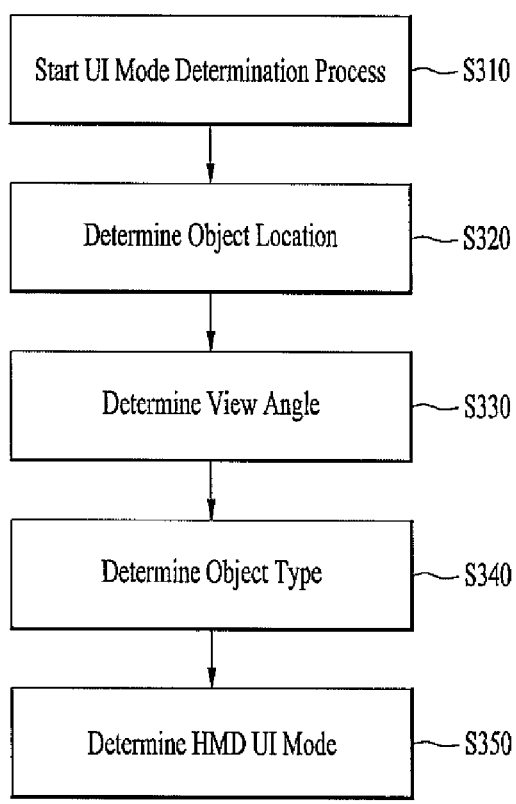
FIGS. 11 and 12 show flowcharts of UI mode determination considering an object type as a third exemplary embodiment of present invention.
Figure 12:
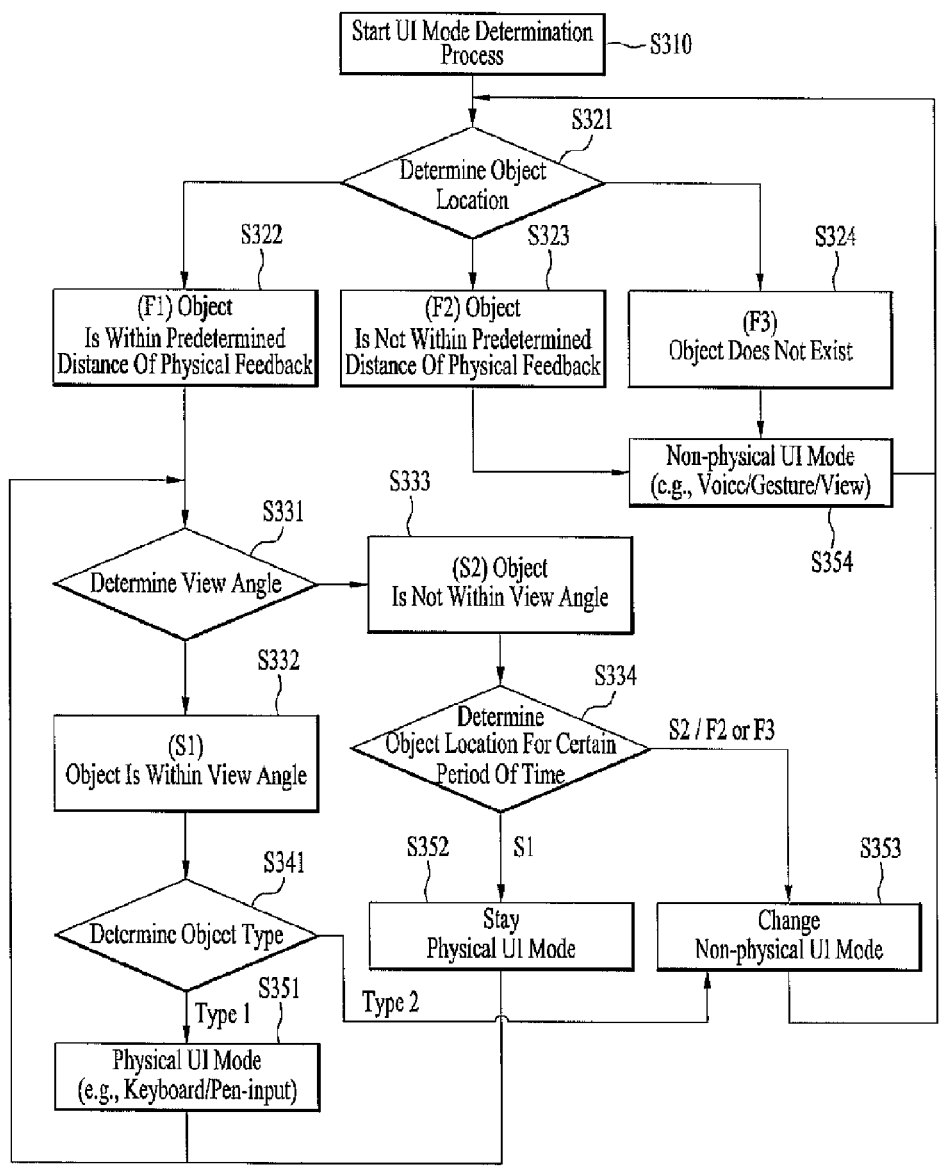
Figure 13A:
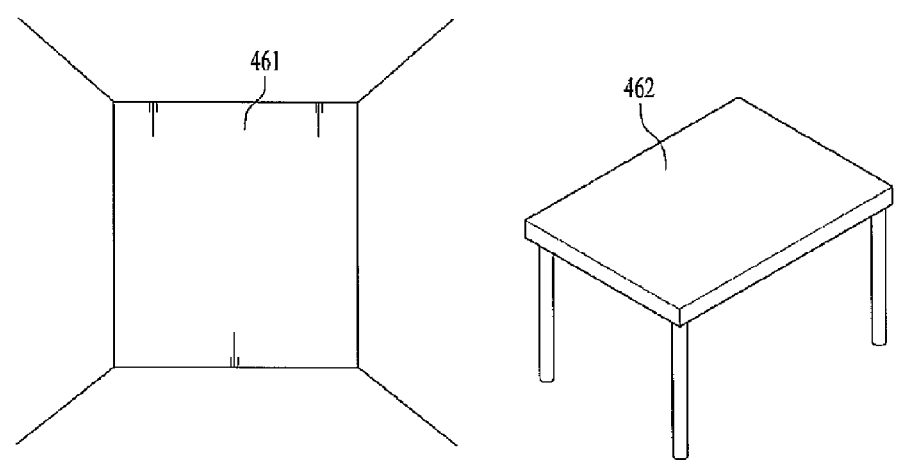
FIGS. 13a and 13b are drawings to show how the UI mode determination process is applied to the third exemplary embodiment of present invention.
Figure 13B:
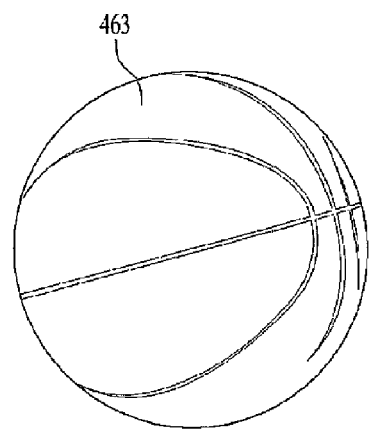

FIGS. 11 and 12 as the third embodiment of the exemplary embodiments show flowcharts of the UI mode determination process regarding the object type. Further, FIGS. 13a and 13b show drawings of how the UI mode determination is applied to the third embodiment. Accordingly, the third embodiment considers the object type more than the second embodiment does. Further illustration is as follows.

According to the third embodiment of the exemplary embodiments, the HMD UI mode determination process includes the steps of object location determination S320, view angle determination S330, object type determination S340, and HMD UI mode determination S350. Once the HMD UI mode determination process begins 5310, the HMD processor 110 detects an object in the proximity of the HMD by the object sensor 121 and determines the location of the detected object. S321. After determining the step of S321, the processor 110 determines the relationship between the HMD and the object as one of the aforementioned F1, F2, and F3 statuses. For example, it is called F1 status when an object is detected and the detected object stays within distance in which physical feedback is possible, shown in S322. In addition, it is called F2 status when an object is detected and the detected object stays not within distance in which physical feedback is possible, shown in S323. Lastly, it is called F3 status when an object does not exist in the proximity of the HMD, shown in S324.

Then, in the case of having determined F1 status S322, the HMD 100 processor 110 further determines whether the detected object is within the HMD view angle S331. For example, according to the step of S331, it can determine either S1 or S2 status.

Through the step of S331, if the HMD processor 110 confirms that the relationship between the current HMD and the object is S2 status S333, the location of the object 400 will be continuously confirmed for the predetermined period of time (e.g., five, ten seconds). In the step of S334, if the object is detected within the view angle within the predetermined period of time, that is, if the status is changed to S1 status, the physical UI mode will be stayed or the mode will be changed to the physical UI mode. S352. That is, through the step of S334, the fact that the user's 10 status changes from S2 to S1 within the predetermined period of time indicates that the user 10 temporarily looked away from the object 400 and did not intend to look away from the object 400. That is, in that case, due to the user's intention of looking away for a short term, it is appropriate that the physical UI mode may be stayed or the then-existing UI mode may be changed to the physical UI mode if the then-existing UI mode is the non-physical UI mode.

On the other hand, in the step of S334, if the object is not detected within the view angle for the predetermined period of time, that is, if S2 status is stayed or if it is changed to F2 or F3 status, the non-physical UI mode may be stayed or the UI mode may be changed to the non-physical UI mode. S353. That is, through the step of S334, if the user's 10 status is stayed as S2 status for the predetermined period of time, it is deemed that the user 10 looked away from the object and intended to look away. Thus, in that case, due to the user's intention of looking away for a long term, the non-physical UI mode may be stayed or the UI mode may change to the non-physical UI mode if the then-existing UI mode is the physical UI mode. Further, through the step of S334, if the user's 10 status changes to F2 or F3 status within the predetermined period of time, it is deemed that the user 10 is moving away from the object 400. That is, in that case, as the object 400 cannot utilize the UI, the non-physical UI mode may be stayed or the UI mode may change to the non-physical UI mode if the UI mode is the physical UI mode.

On the other hand, if, through the step of the view angle determination S331, the relationship between the current HMD and the object is confirmed to be S1 status 5332, the HMD processor 110 further determines the object type. S341. Accordingly, the object type is the external shape of an object and can be categorized based on whether the object is user-interfaceable. For example, the wall 461 or the table 462 shown in FIG. 13a are Type 1 which the user can easily have a contact with or is user-interfaceable. In contrast, for example the basketball 463 shown in FIG. 13b is Type 2 that the user cannot easily have a contact with or is not user-interfaceable.

When the HMD processor 110 determines through the step of object type determination S341 that the corresponding object is Type 1, it determines the physical UI mode as the HMD UI mode. S351. Then, through the aforementioned physical UI mode control unit 171, the UI methods such as the virtual keyboard UI and drawing UI that can have a contact with or touch the Type 1 objects such as the wall 461 and table 462 will be operated.

Further, when the HMD processor 110 determines through the step of object type determination S341 that the corresponding object is Type 2, it selects the non-physical UI mode as the HMD UI mode. S353. Then, through the aforementioned non-physical UI mode control unit 172, regardless of the Type 2 object 463 existing within the predetermined distance and the view angle, applicable non-physical UI methods such as the voice recognition UI and the gesture UI will be operated. Accordingly, the types and operating methods of the physical and non-physical UIs shown in the first embodiment will be applied the same in the third embodiment.

Further, in the case of the physical UI mode being applied as if shown in S351 and S352, the processor 110 continuously determines whether the object 400 used for the physical UI stays not within the HMD view angle. S351/S352→S331. On the other hand, in the case of the non-physical UI mode being applied as if shown in S343 and S344, the processor 110 continuously determines whether the object 400 is detected within the predetermined distance. S343/S344→S321.

Figure 14:
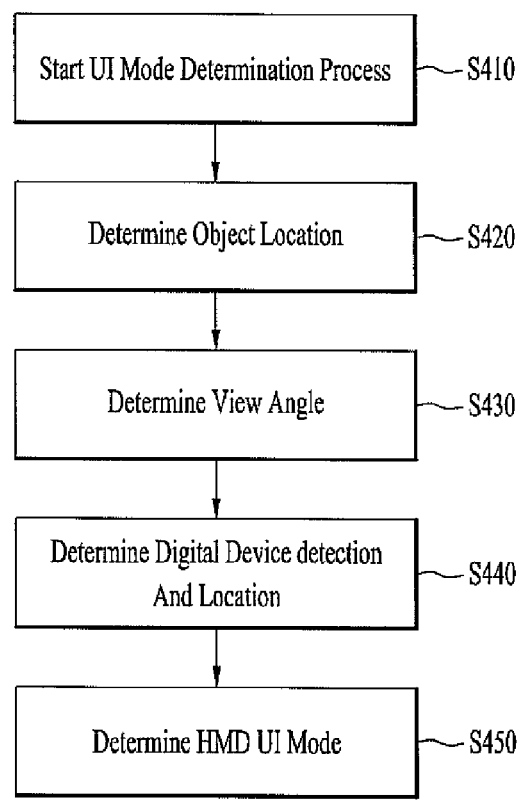
FIGS. 14 and 15 show flowcharts of UI mode determination process utilizing a digital device within a view angle as a fourth exemplary embodiment of present invention.
Figure 15:
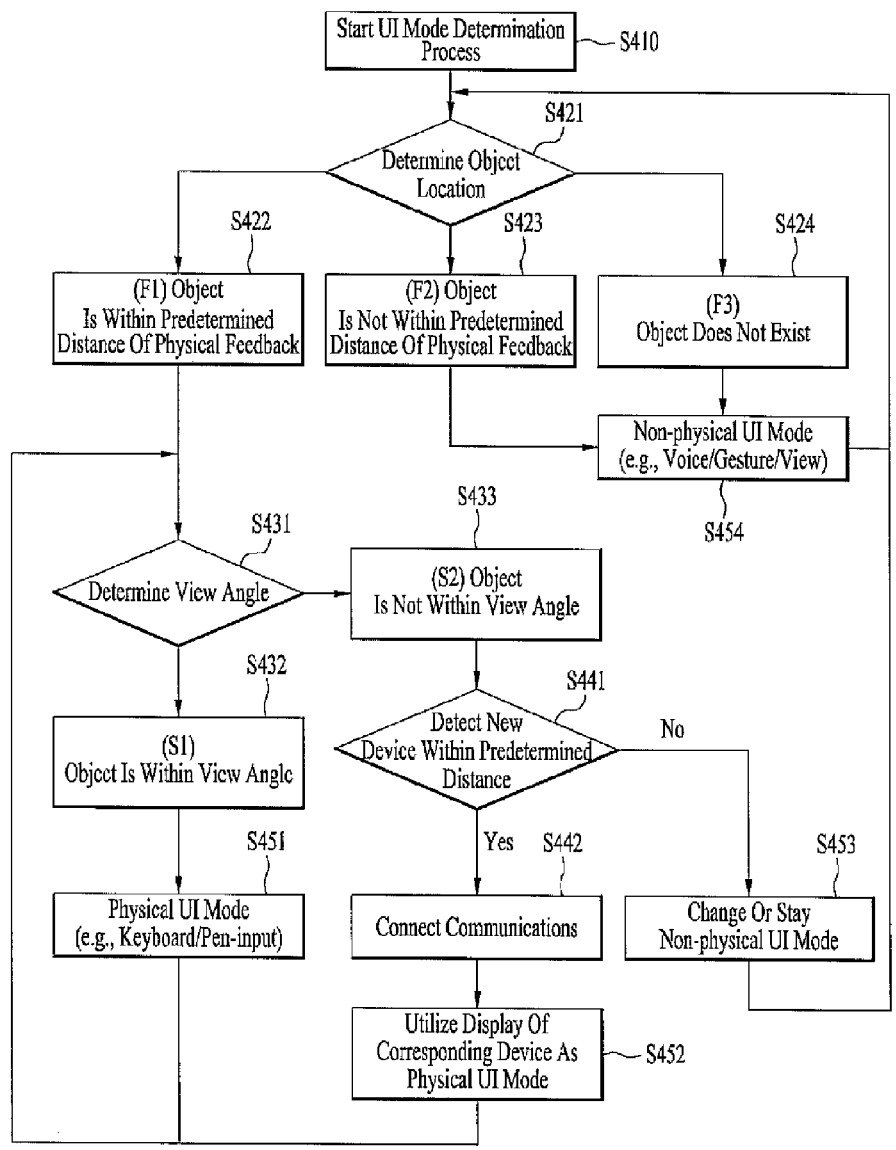
Figure 16:
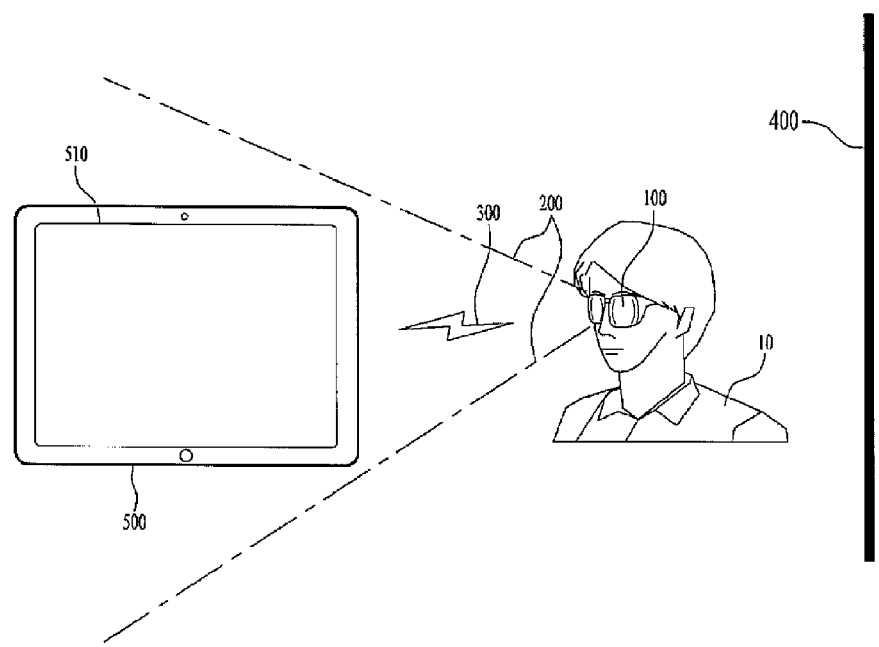
FIG. 16 is a drawing to show how the UI mode determination process is applied to the fourth exemplary embodiment of present invention.

FIGS. 14 and 15 as the fourth embodiment show flowcharts of the UI mode determination considering detecting a new digital device. Further, FIG. 16 shows a drawing of how the UI mode determination is applied to the fourth embodiment. Accordingly, the fourth amendment of the exemplary embodiments considers detecting a new digital device more than the second embodiment does. Further description is as follows.

According to the fourth embodiment of the exemplary embodiments, the HMD UI mode determination process includes the steps of object location determination S420, view angle determination S430, digital device detection and location determination S440 and HMD UI mode determination S450. Once the HMD UI mode determination process begins 5410, the HMD processor 110 detects an object in the proximity of the HMD by the object sensor 121 and determines the location of the object S421. After determining the step of S421, the processor 110 determines the relationship between the HMD and the object as one of the aforementioned F1, F2, and F3 statuses. For example, it is called F1 status when an object is detected and the detected object stays within distance in which physical feedback is possible, shown in S422. In addition, it is called F2 status when an object is detected and the detected object stays not within distance in which physical feedback is possible, shown in S423. Lastly, it is called F3 status when an object does not exist in the proximity of the HMD, shown in S424.

Then, in the case of having determined F1 status S422, the HMD 100 processor 110 further determines by the view angle sensor 120 whether the detected object is within the HMD view angle. S431. For example, according to the step of S431, it can determine either S1 or S2 status.

Through the step of S431, if the HMD processor 110 determines that the detected object is not within the view angle (S2 status, S433), it determines whether a new digital device within the predetermined distance exists. S441. For example, according to FIG. 16, the HMD user 10 can look away from the original detected object 400 to a nearby digital device 500. Thus, in that case, if the new device 500 is detected within the predetermined distance through the step of S441, the HMD processor 110 tries to perform connecting communications with the corresponding digital device 500 by using the communications unit 140. Once communications between the HMD 100 and the device 500 are connected, the HMD processor 110 utilizes a display method 510 in the digital device 500 as the physical mode by using the UI control unit 170. S452.

Also, in the step of S441, if it is deemed that a new digital device does not exist within the view angle, the HMD processor 110 interprets that the user intended to look away for a long term and stays the non-physical UI mode. If the original UI mode is the physical UI mode, it may be changed to the non-physical UI mode.

On the other hand, through the step of view angle determination S431, if the HMD processor 110 determines that the detected object is within the predetermined distance (S1 status, S432), the HMD processor 110 operates the physical UI mode as the HMD UI mode. S451. The type and operating methods of the physical and non-physical UIs shown in the first amendment will be applied the same in the fourth amendment.

In addition, although it is not shown in the drawing, according to the step of S451, if a new digital device is detected within the predetermined distance while the object within the predetermined distance is being applied as the physical UI, the display function of the corresponding new digital device can be utilized as the physical UI mode. For example, the physical UI on the surface of the object may be deleted but the deleted physical UI may be removed and applied to the display of the digital device. Also, the physical UI may be stayed on the surface of the object and the display function of the digital device can be used as another physical UI that is different from the physical UI of the surface of the object. For example, the physical UI of the object surface can be used as the virtual keyboard UI and the display function of the digital device can be used as the drawing UI. Also, for example, the physical UI of the object surface can be used as the numbers pad of the virtual keyboard and the display function of the digital device can be used as the letters pad of the virtual keyboard.

Further, in the case of the physical UI mode being applied as if shown in S451 and S452, the processor 110 continuously determines whether the object 400 used for the physical UI or the digital device 500 stay not within the HMD view angle. S451/S452→5431. On the other hand, in the case of the non-physical UI mode being applied as if shown in S453 and S454, the processor 110 continuously determines whether the object is detected within the predetermined distance. S453/S454→5321.

Figure 17:
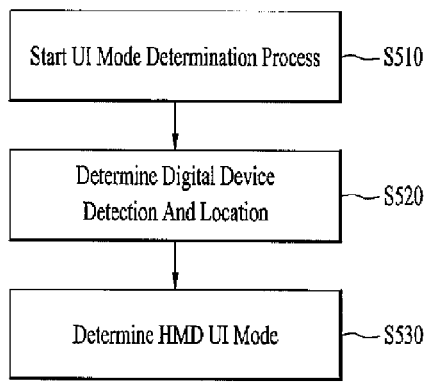
FIGS. 17 and 18 show flowcharts of UI mode determination process utilizing a digital device as a fifth exemplary embodiment of present invention.
Figure 18:
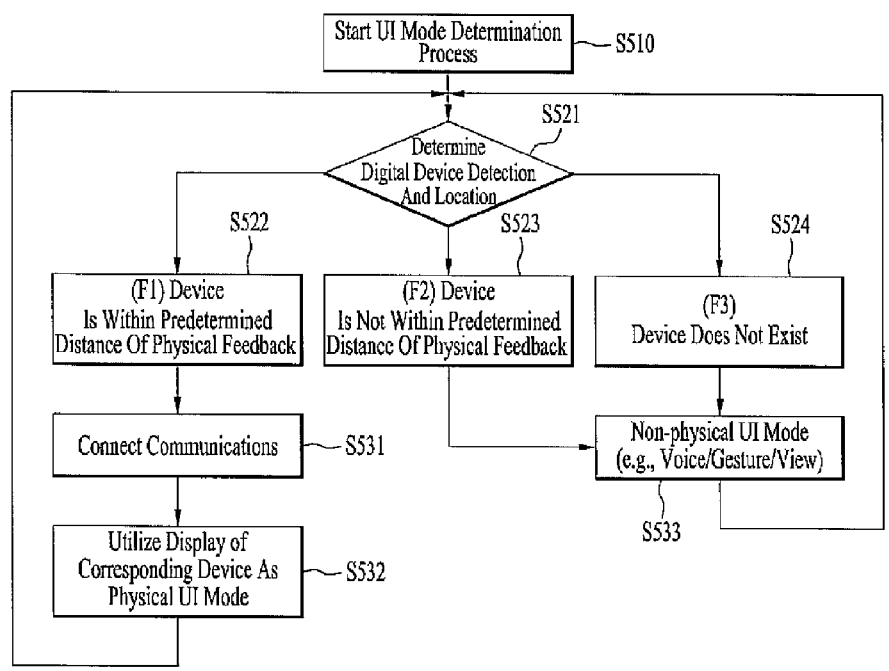

FIGS. 17 and 18 as the fifth embodiment of exemplary embodiments show flowcharts of the UI mode determination considering the detection of a digital device. Further illustration is as follows.

According to the fifth embodiment, the HMD UI mode includes the steps of digital device detection and location determination S520 and HMD UI mode determination S530. When the HMD UI mode determination process begins S510, the HMD processor 110 detects a digital device in the proximity of the HMD using the object sensor 121 and the communications unit 140 and determines the location of the detected digital device. S521. After determining the step of S521, the processor 110 determines the relationship between the HMD and the digital device as one of the aforementioned F1, F2, and F3 statuses. For example, it is called F1 status when a device is detected and the detected device stays within distance in which physical feedback is possible, shown in S522. In addition, it is called F2 status when a device is detected and the detected device stays not within distance in which physical feedback is possible, shown in S523. Lastly, it is called F3 status when a device does not exist in the proximity of the HMD, shown in S524.

If the HMD processor 110 determines that it is F1 status S522, the HMD processor 110 performs connecting communications through the communications 140. S531. If the communications connection is completed, the HMD processor 110 operates the physical UI mode by using the display in the device through the aforementioned UI control unit 170. S531. That is, the display equipped in the corresponding device can be utilized as the HMD virtual keyboard. On the other hand, if the HMD processor 110 determines that it is F2 status S523 or F3 status S524, the HMD processor 110 operates the non-physical UI mode through the aforementioned UI control unit 170. S533.

It will be apparent to those skilled in the art that various modifications and variations can be made in the exemplary embodiments without departing from the spirit or scope of the exemplary embodiments. Thus, it is intended that the exemplary embodiments covers the modifications and variations of this exemplary embodiments provided they come within the scope of the appended claims and their equivalents.

What is claimed is:

1. A User Interface (UI) apparatus for a Head Mounted Display (HMD), the apparatus comprising:
   a sensor unit detecting whether an object exists in the proximity of the HMD and if the object is detected, sensing a distance between the object and the HMD; and
   a processor controlling a User Interface (UI) of the HMD based on a result of the sensor unit such that a physical User Interface (UI) mode is applied if the detected object is within a predetermined distance from the HMD and a non-physical User Interface (UI) mode is applied if the object is not detected or is not within the predetermined distance from the HMD,
   wherein the processor receives a user command inputted to the UI of the HMD in the physical UI mode by physically contacting the object and in the non-physical UI mode by not physically contacting the object.

2. The apparatus of claim 1, wherein the physical UI mode displays an imaginary User Interface (UI) function on a surface of the detected object.

3. The apparatus of claim 2, wherein the physical UI mode comprises at least one of a virtual keyboard User Interface (UI) or a drawing User Interface (UI).

4. The apparatus of claim 1, wherein the non-physical UI mode operates in a status in which the non-physical UI does not have a physical contact with the object.

5. The apparatus of claim 4, wherein the non-physical UI mode comprises at least one of a voice recognition User Interface (UI) or a gesture User Interface (UI).

6. The apparatus of claim 1, wherein the processor selects the physical UI mode if the detected object is within the predetermined distance and the detected object is within a view angle.

7. The apparatus of claim 6, wherein the processor changes to the non-physical UI mode if the detected object is within the view angle but is not user-interfaceable.

8. The apparatus of claim 6, wherein the processor selects the non-physical UI mode if the detected object is within the predetermined distance from the HMD but not within the view angle.

9. The apparatus of claim 8, wherein the processor changes to the physical UI mode if the detected object is not within the view angle but returns within the view angle within a predetermined period of time.

10. The apparatus of claim 8, wherein the processor stays the non-physical UI mode if the detected object is not within the view angle and does not return within the view angle within the predetermined period of time.

11. The apparatus of claim 1, wherein the processor selects the non-physical UI mode if the detected object is within the predetermined distance from the HMD but not within the view angle, and the detected object does not return within the view angle within the predetermined period of time.

12. The apparatus of claim 1, wherein the processor applies a display function of a new digital device as the physical UI mode if the detected object is within the predetermined distance from the HMD but not within the view angle, and the new digital device is detected within the predetermined distance within a certain period of time.

13. The apparatus of claim 12, wherein the processor applies the display of the new digital device as the physical UI mode if the object is not detected or is not within the predetermined distance from the HMD, and the new digital device is detected within the predetermined distance within the certain period of time.

14. A User Interface (UI) apparatus for a Head Mounted Display (HMD), the apparatus comprising:
- a communications unit performing communications with a digital device in the proximity of the HMD;
- a sensor unit detecting whether the digital device exists in the proximity of the HMD, and if the digital device is detected, sensing a distance between the digital device and the HMD; and
- a processor controlling a User Interface (UI) of the HMD based on a result of the sensor unit, wherein a display function of the digital device is applied as a physical User Interface (UI) mode if the detected digital device is within a predetermined distance from the HMD and a non-physical User Interface (UI) mode is applied if the digital device is not detected or is not within the predetermined distance from the HMD,
- wherein the processor receives a user command inputted to the UI of the HMD in the physical UI mode by physically contacting the object and in the non-physical UI mode by not physically contacting the object.

15. A method of providing a User Interface (UI) for a Head Mounted Display (HMD), the method comprising:
- detecting whether an object exists in the proximity of the HMD;
- if the object is detected, determining a distance between the detected object and the HMD; and
- if the object is within a predetermined distance from the HMD, applying a physical User Interface (UI) mode, and if the object is not detected or is not within the predetermined distance from the HMD, applying a non-physical UI mode,
- wherein the processor receives a user command inputted to the UI of the HMD in the physical UI mode by physically contacting the object and in the non-physical UI mode by not physically contacting the object.

16. The method of claim 15, further comprising selecting the physical UI mode if the detected object is within the predetermined distance from the HMD and within a view angle.

17. The method of claim 16, further comprising changing to the non-physical UI mode if the detected object is within the view angle but is not user-interfaceable.

18. The method of claim 16, further comprising selecting the non-physical UI mode if the detected object is within the predetermined distance from the HMD but not within the view angle.

19. The method of claim 18, further comprising changing to the physical UI mode if the detected object is not within the view angle but returns within the view angle within a predetermined period of time.

20. The method of claim 18, further comprising continuously staying the non-physical UI mode if the detected object is not within the view angle and does not return within the view angle within a predetermined period of time.

\* \* \* \* \*